(12) United States Patent
Sugimoto

(10) Patent No.: US 7,090,385 B2
(45) Date of Patent: Aug. 15, 2006

(54) VEHICLE HEADLAMP

(75) Inventor: Atsushi Sugimoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/839,989

(22) Filed: May 5, 2004

(65) Prior Publication Data

US 2005/0024889 A1 Feb. 3, 2005

(30) Foreign Application Priority Data

May 22, 2003 (JP) .......................... P.2003-145059

(51) Int. Cl.
*F21V 11/00* (2006.01)

(52) U.S. Cl. ...................... 362/539; 362/460; 362/284; 362/465; 362/523; 362/538

(58) Field of Classification Search ................ 362/539, 362/460, 465, 523, 538, 282, 284
See application file for complete search history.

(56) References Cited

U.S. PATENT DOCUMENTS 5,379,196 A * 1/1995 Kobayashi et al. ......... 362/466

FOREIGN PATENT DOCUMENTS

| EP | 0780823 A1 | 6/1997 |
|---|---|---|
| EP | 1 033 528 A2 | 9/2000 |
| EP | 1033528 A2 | 9/2000 |
| JP | 06-139802 | 5/1994 |
| JP | 6-48601 | 6/1994 |
| JP | 08-106803 | 4/1996 |
| WO | WO 99/13265 | 3/1999 |
| WO | WO 2005/024296 | 3/2005 |

* cited by examiner

*Primary Examiner*—Sandra O'Shea
*Assistant Examiner*—Mark Tsidulko
(74) *Attorney, Agent, or Firm*—Fish & Richardson P.C.

(57) ABSTRACT

A shade includes a pivot member disposed along a horizontal axis extending in the transverse direction of a vehicle and configured to pivot about the horizontal axis. An indentation section extending in the transverse direction of the vehicle is formed in a portion of an outer peripheral surface of the shade. Two areas on the outer peripheral surface in the circumferential direction thereof are formed as a first distributed light generation section for generating a left low beam light distribution pattern, and a second distributed light generation section for generating a right low beam light distribution pattern. The indentation section is formed as a third distributed light generation section for generating a high beam light distribution pattern.

13 Claims, 13 Drawing Sheets

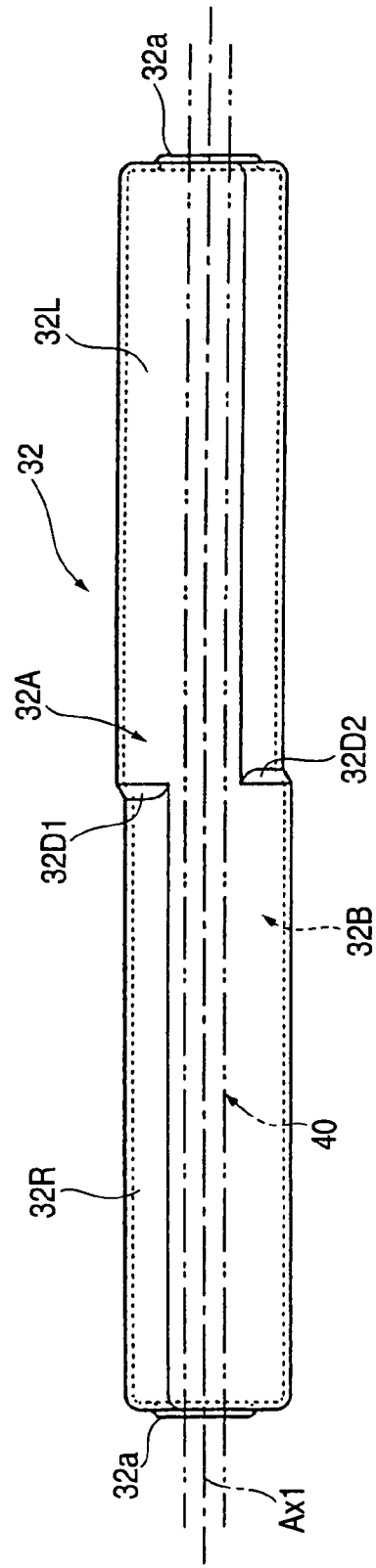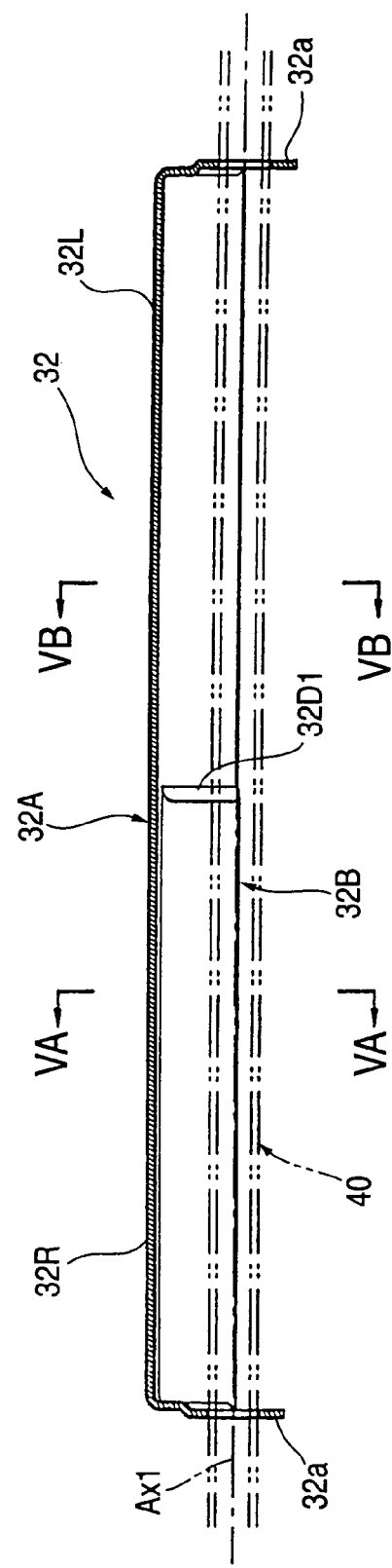

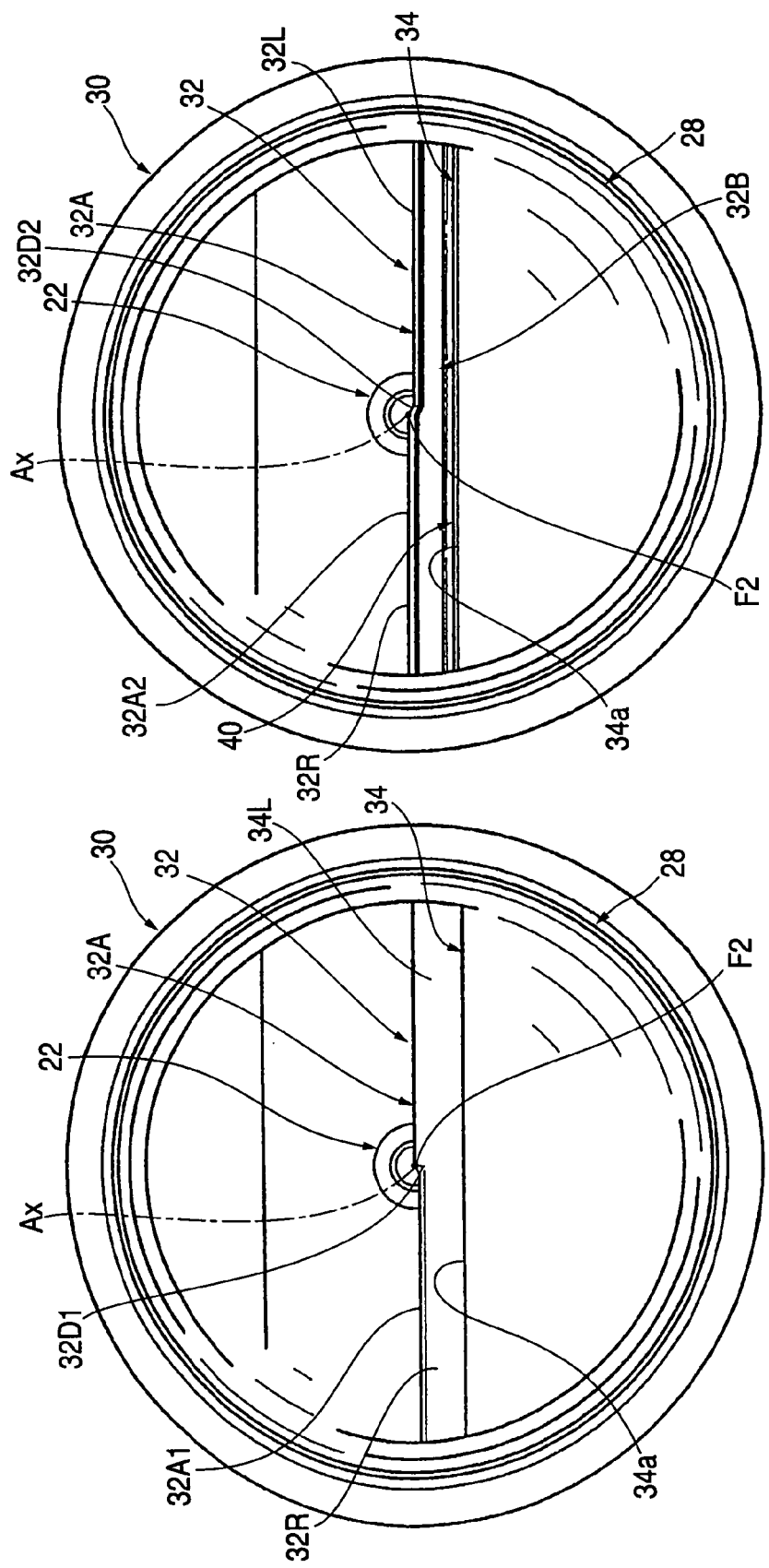

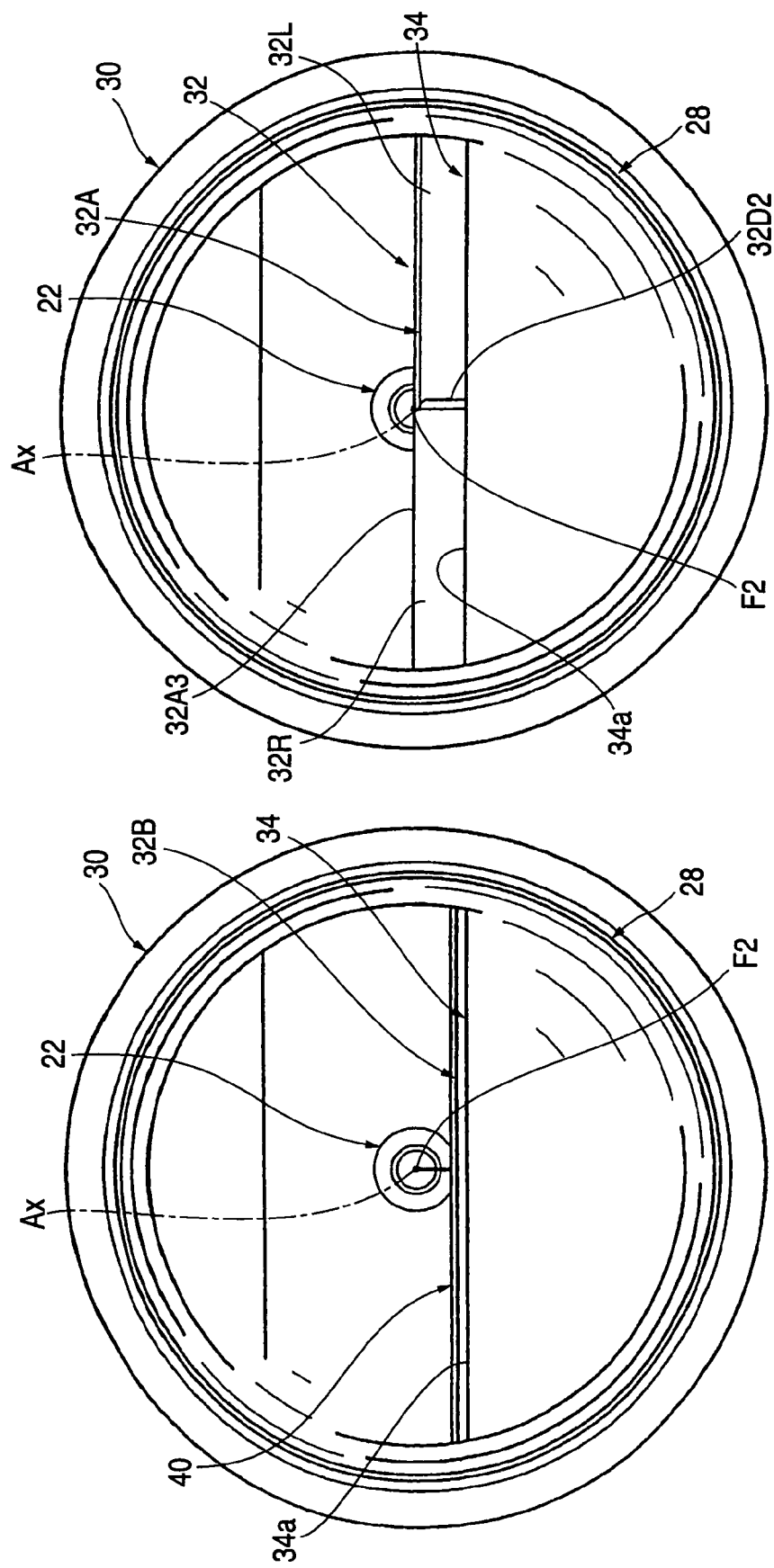

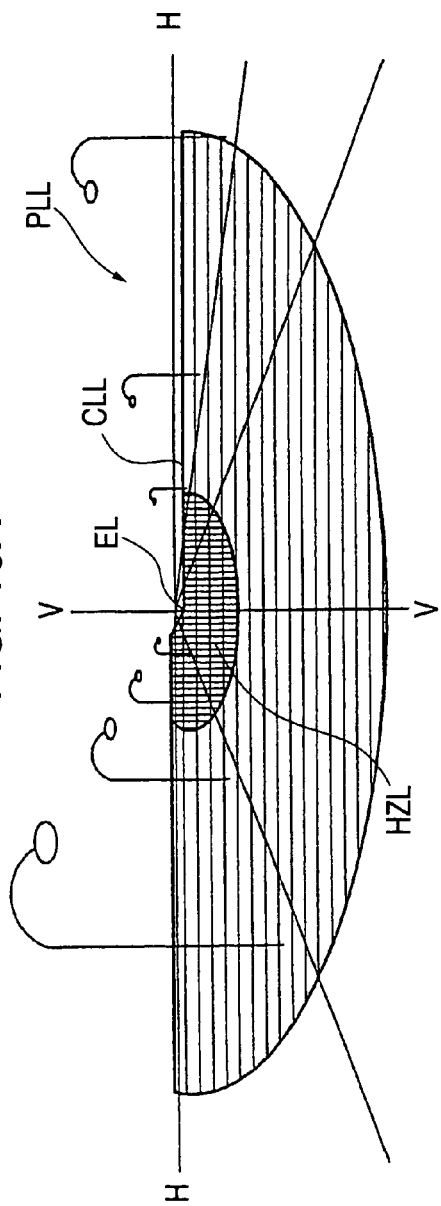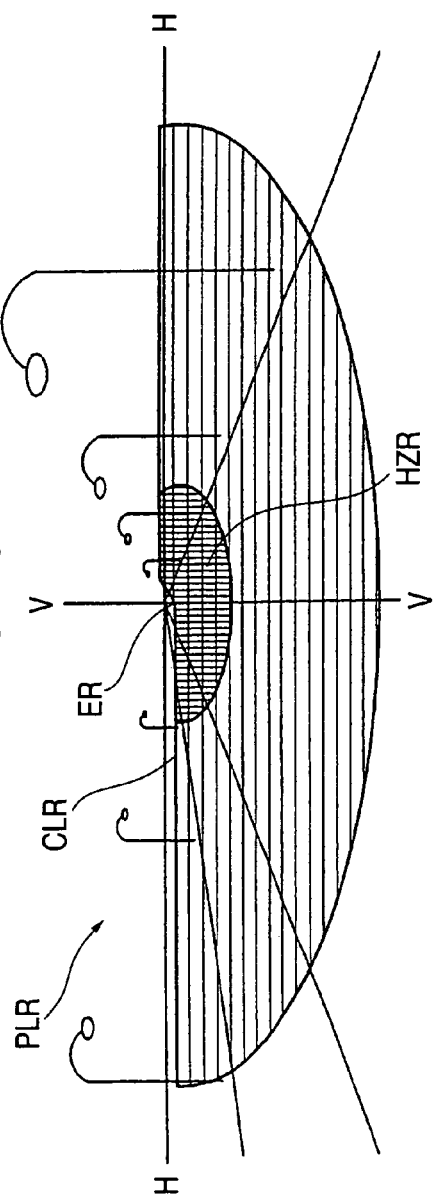

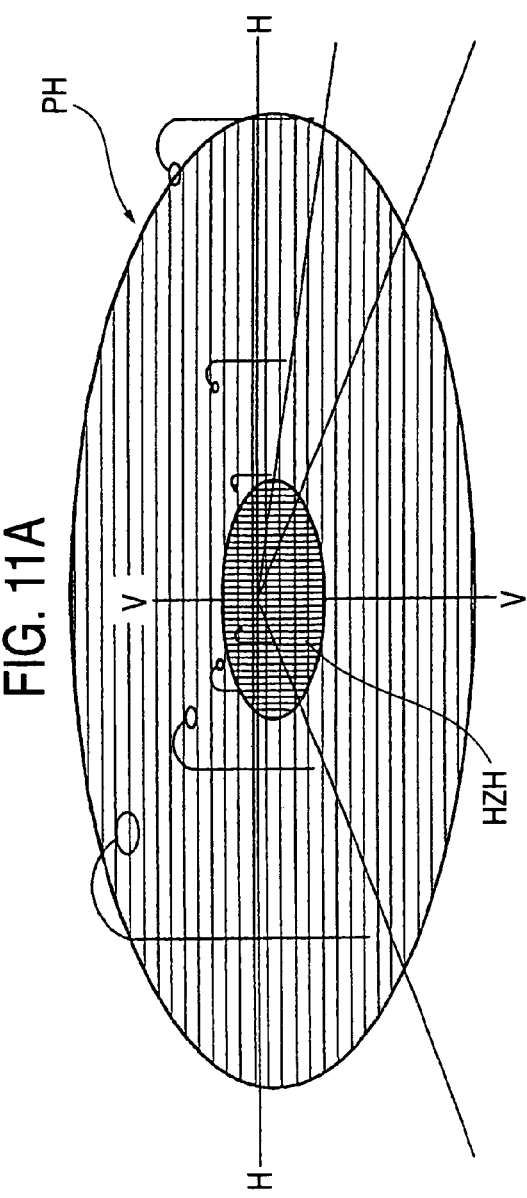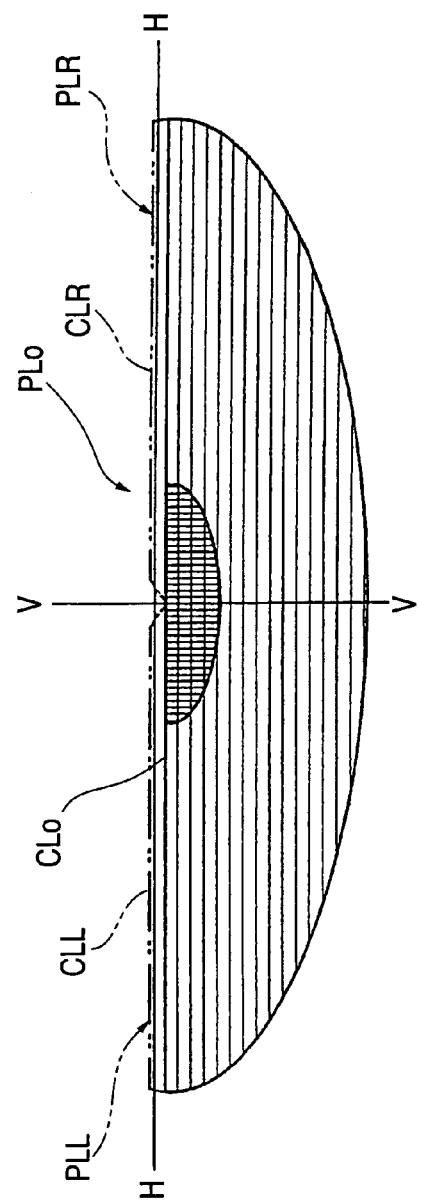

VEHICLE HEADLAMP

This application claims foreign priority based on JPA 2003-145059, filed May 22, 2003, the contents of which is incorporated herein by reference.

BACKGROUND OF THE INVENTION

1. Technical Field

The present invention relates to a vehicle headlamp configured to form a light distribution pattern having a cut-off line formed at an upper end portion thereof, by means of a lamp unit of the so-called projector type.

2. Related Art

A related art vehicle headlamp is configured to emit light ahead of a vehicle by means of a lamp unit of the projector type.

The related art projector type lamp unit is configured such that light originating from a light source disposed in the vicinity of an optical axis extending in a longitudinal direction of a vehicle is gathered and reflected toward the front and around the optical axis by a reflector. The thus-reflected light is emitted ahead of the lamp by a projection lens provided in front of the reflector.

When a light distribution pattern having a cut-off line formed at an upper portion thereof is formed by means of the lamp unit, a shade is disposed in the vicinity of a rear focal point of the projection lens. A portion of the light reflected from the reflector is interrupted by the shade, to thus form the cut-off line.

Japanese publication JP-B-6-48601 describes a shade configured to enable selection between a light distribution pattern for a left-distributed low beam and a light distribution pattern for a high beam, serving as a light distribution pattern resulting from emission of light from the lamp unit. The light distribution is done by pivoting the shade—which is configured to pivot about a horizontal axis extending in a transverse direction of a vehicle—in accordance with a vehicle driving condition. JP '601 further suggests, as a modification, the ability to select a light distribution pattern for a right-distributed low beam.

European Patent Application Laid-Open No. 1033528 describes a shade configured such that two areas in an outer peripheral surface of the shade formed from a rotary shaft member, the shaft member configured to pivot about a horizontal axis extending in a transverse direction of a vehicle, are configured as a region to be used for generating a light distribution pattern for a left-distributed low beam (hereinafter simply called a "left low beam light distribution pattern") and another region to be used for generating a light distribution pattern for a right-distributed low beam (hereinafter simply called a "right low beam light distribution pattern").

However, the related art has various problems and disadvantages. For example, but not by way of limitation, the shade described in JP '601 is configured such that a plurality of blades is fastened to a rotary shaft member at predetermined intervals in a circumferential direction thereof. To generate a light distribution pattern having a cut-off line formed at an upper end portion thereof by means of the shade, the blade must be configured to accurately stop at a predetermined rotational angular position. To this end, accurate control of rotational movement of the shade is required.

In contrast, the shade described in European '528 generates the left low beam light distribution pattern or the right low beam light distribution pattern via the outer peripheral surface of the rotary shaft member. Hence, if some degree of displacement has arisen in the rotational angle, no essential change arises in the shape of the cut-off line. Hence, a necessity for accurate control of rotational movement of the shade is obviated.

However, the shade described in European '528 encounters a problem of a failure to form a light distribution pattern for a high beam.

SUMMARY OF THE INVENTION

The present invention has been conceived in light of the circumstances set forth. It is an object of the present invention to provide a vehicle lamp configured to form a light distribution pattern having a cut-off line formed at an upper end portion thereof by means of a lamp unit of the so-called projector type equipped with a pivotable shade, wherein the lamp enables selection between a left-distributed low beam and a right-distributed low beam and between a low beam and a high beam, as well as simplified control of rotational movement of the shade. However, the present invention need not achieve this object, or any other object.

The present invention includes means of putting contrivance into the configuration of a shade. More specifically, a vehicle headlamp according to the invention corresponds to a vehicle headlamp configured to form a light distribution pattern having a cut-off line formed at an upper end portion thereof, by means of a lamp unit comprising a light source disposed in the vicinity of an optical axis extending in a longitudinal direction of a vehicle, a reflector for gathering and reflecting light originating from the light source toward the front and around the optical axis, a projection lens disposed ahead of the reflector, and a shade which is disposed at a rear focal point of the projection lens and interrupts a portion of the light reflected from the reflector, wherein the shade is formed from a pivot member which is disposed along a horizontal axis extending in a transverse direction of the vehicle in the vicinity of an area below the optical axis and which is configured to be able to pivot about the horizontal axis;

an indentation section extending in a transverse direction of the vehicle is formed in a portion of an outer peripheral surface of the shade in a circumferential direction; and two areas in the outer peripheral surface of the shade in the circumferential direction are formed as a first distributed light generation section to be used for generating a light distribution pattern for a left-distributed low beam and a second distributed light generation section for generating a light distribution pattern for a right-distributed low beam, and the indentation section of the shade is formed as a third distributed light generation section to be used for generating a light distribution pattern for a high beam.

The expression "disposed in the vicinity of an optical axis extending in a longitudinal direction of a vehicle" is a concept encompassing a mode in which the light source is disposed at a position slightly deviated from the optical axis as well as a mode in which the light source is disposed accurately in line with the optical axis.

The "light source" is not limited to any specific type. For instance, a discharge illumination section of a discharge bulb, a filament of a halogen bulb, or the like can be adopted.

The expression "cut-off line" is not limited to any specific geometry, so long as the line is formed at an upper end of a light distribution pattern.

The word "shade" means a pivot member disposed along a horizontal axis extending in the transverse direction of a vehicle and configured so as to be able to pivot about the horizontal axis. The shade is not limited to any specific configuration, such as material or the geometry of an outer periphery, so long as an indentation section extending in the transverse direction of the vehicle is formed in a portion of an outer peripheral surface of the shade.

The term "indentation section" is not limited to any specific shape, so long as the an indentation section is formed so as to extend in the transverse direction of the vehicle while being recessed with respect the outer peripheral surface of the shade.

Rotation of the "shade" is performed through use of a predetermined shade drive mechanism. Drive and control of the shade drive mechanism may be performed manual operation of a changeover switch or the like or automatically carried out in accordance with the vehicle drive conditions. Alternatively, the drive control of the shade drive mechanism may be performed by combination of the manual operation and the automatic operation. In this case, the expression "vehicle drive condition" signifies the quantity of various states related to vehicle driving or external information. For instance, a vehicle speed, a steering angle, the attitude of a vehicle, a distance between a vehicle driving ahead and a vehicle of interest, a weather, navigational information, and the like correspond to the vehicle drive conditions.

As can be seen from the configuration set forth, a vehicle headlamp of the present invention is configured so as to be able to form a light distribution pattern having a cut-off line formed at an upper end portion thereof by means of a lamp unit of projector type having a pivotable shade. The shade is formed from a pivot member which is disposed along a horizontal axis extending in a transverse direction of the vehicle in the vicinity of an area below the optical axis and which is configured to be able to pivot about the horizontal axis. Two areas in the outer peripheral surface of the shade in the circumferential direction are formed as a first distributed light generation section to be used for generating a light distribution pattern for a left-distributed low beam and a second distributed light generation section for generating a light distribution pattern for a right-distributed low beam, and the indentation section of the shade is formed as a third distributed light generation section to be used for generating a light distribution pattern for a high beam. Hence, there can be yielded the following working-effects.

Specifically, if the first distributed light generation section is moved to the upper section by means of pivoting the shade, a left low beam light distribution pattern can be generated by means of the shade's action of blocking the light reflected from the reflector. If the second distributed light generation section is moved to the upper section by means of pivoting the shade, a right low beam light distribution pattern can be generated by means of the shade's action of blocking the light reflected from the reflector. Moreover, if the indentation section is arranged to the upper section, the shade's action of blocking the light reflected from the reflector is canceled or significantly alleviated, thereby enabling generation of a high beam light distribution pattern.

Further, the shade is arranged to generate the left low beam light distribution pattern and the right low beam light distribution pattern on the outer peripheral surface. The first and second distributed light generation sections are formed over a predetermined angle range in the circumferential direction. Hence, even when some degree of displacement has arisen in the rotational angular position of the shade, occurrence of a substantial change in the shape of the cut-off line of the left low beam light distribution pattern and the shape of the cut-off line of the right low beam light distribution pattern can be prevented. As a result, there can be obviated a necessity for strictly controlling rotational movement of the shade.

According to the present invention, in a vehicle headlamp configured to form a light distribution pattern having a cut-off line formed at an upper end portion thereof by means of a lamp unit of projector type having a pivotable shade, it is possible to perform switching between a left light distribution of low beam and a right light distribution of low beam and switching between the low beam and the high beam, as well as simplification of rotational control of the shade 32.

In the above-described configuration, when the outer peripheral surface of the shade is formed over the range of central angle of about 180° with respect to the horizontal axis, the circumferential range in which the first and second distributed light generation sections are to be formed can be ensured sufficiently. Further, the indentation section constituting the third distributed light generation section is given a shape sufficiently receded from the outer peripheral surface of the shade, thereby enabling an attempt to cancel or significantly alleviate the shade' action for blocking the light reflected from the reflector.

The "shade" is not limited to any specific configuration as mentioned previously. However, if the shade is formed from a plate-like member, an attempt can be made to make the shade lightweight as compared with a case where the shade is formed from a block-shaped member or the like, and the shade can also be manufactured at low cost by means of press-molding or the like.

Further, in connection with the previously-described configuration, at least portions of the first and second distributed light generation sections in the circumferential direction thereof are formed such that the radial distances from the horizontal axis to the outer peripheral surface of the shade gradually change in accordance with a change in the circumferential angular position. Hence, the positions of the cut-off lines can be vertically changed in a stepless manner in accordance with the driving conditions or the like. As result, the forward visibility of the driver can be enhanced to a great extent while suppressing casting of glare onto drivers of oncoming vehicles or the like.

In the foregoing configuration, if the light distribution switching section is formed between the first distributed light generation section and the second distributed light generation section in the outer peripheral surface of the shade, wherein a radial distance of the light distribution switching section is equal to or greater than radial distances of areas where a distance from the horizontal axis to the outer peripheral surface of the shade becomes maximum, switching between the left-distributed light of low beam and the right-distributed light of low beam can be performed without occurrence of glaring light.

In the foregoing configuration, if the configuration is formed such that rotational switching between the first distributed light generation section and the second distributed light generation section is performed on the basis of the positional information about the vehicle, switching between the left low beam distribution and the right low beam distribution can be adequately performed according to geographical conditions. As a result, there can be prevented inadvertent casting of glare onto, e.g., drivers of oncoming vehicles, which would otherwise be caused as a result of having forgotten to perform manual switching.

BRIEF DESCRIPTION OF THE DRAWINGS

FIGS. 4A–B show the shade as a single piece, wherein FIG. 4A is a plan view of the shade, and FIG. 4B is a cross-sectional view taken along a horizontal axis, according to the exemplary, non-limiting embodiment of the present invention;

FIGS. 5A–B show the shade in greater detail, wherein FIG. 5A is a cross-sectional view of the shade taken along line Va—Va shown in FIG. 4B, and FIG. 5B is a cross-sectional view of the same taken along line Vb—Vb shown in FIG. 4B, according to the exemplary, non-limiting embodiment of the present invention;

FIGS. 8A–B are a front view showing the principal sections of the lamp unit according to the exemplary, non-limiting embodiment of the present invention, wherein FIG. 8A is a view showing the state of the shade when the shade is situated at a left light distribution formation angular position; and FIG. 8B is a view showing the state of the shade when the shade is situated at a right light distribution formation angular position;

FIGS. 9A–B are front views showing the principal sections of the lamp unit according to the exemplary, non-limiting embodiment of the present invention, wherein FIG. 9A is a view showing the state of the shade when the shade is situated at the high beam formation angular position; and FIG. 9B is a view showing the state of the shade when the shade is situated at the left/right light distribution switching position;

FIGS. 10A–B perspectively show a light distribution pattern formed on a virtual vertical screen disposed at a position spaced 25 m ahead of the lamp unit according to the exemplary, non-limiting embodiment of the present invention, wherein FIG. 10A is a perspective view of the light distribution pattern achieved when the shade is situated at the left light distribution formation angular position, and FIG. 10B is a perspective view of the light distribution pattern achieved when the shade is situated at the right light distribution formation angular position;

FIGS. 11A–B perspectively show a light distribution pattern formed, by the light forwardly radiating from the lamp unit according to the exemplary, non-limiting embodiment of the present invention, on the previously-described virtual vertical screen, wherein FIG. 11A is a view of the light distribution pattern achieved when the shade is situated at a high beam formation angular position, and FIG. 11B is a view of the light distribution pattern achieved when the shade is situated at the left/right light distribution switching position;

FIGS. 12A–B perspectively show characteristic portions of a light distribution pattern formed on the virtual vertical screen, wherein FIG. 12A is a perspective view of the light distribution pattern achieved when the shade is situated at the left light distribution formation angular position, and FIG. 12B is a perspective view of the light distribution pattern achieved when the shade is situated at the right light distribution formation angular position; and FIGS. 13A–B show modifications of the shade according to the exemplary, non-limiting embodiment of the present invention, wherein FIG. 13A is a view showing a shade according to a first exemplary, non-limiting modification, and FIG. 13B shows a shade according to a second exemplary, non-limiting modification.

DETAILED DESCRIPTION OF THE INVENTION

Embodiments of the invention will be described hereinbelow by reference to the drawings.

Figure 1:
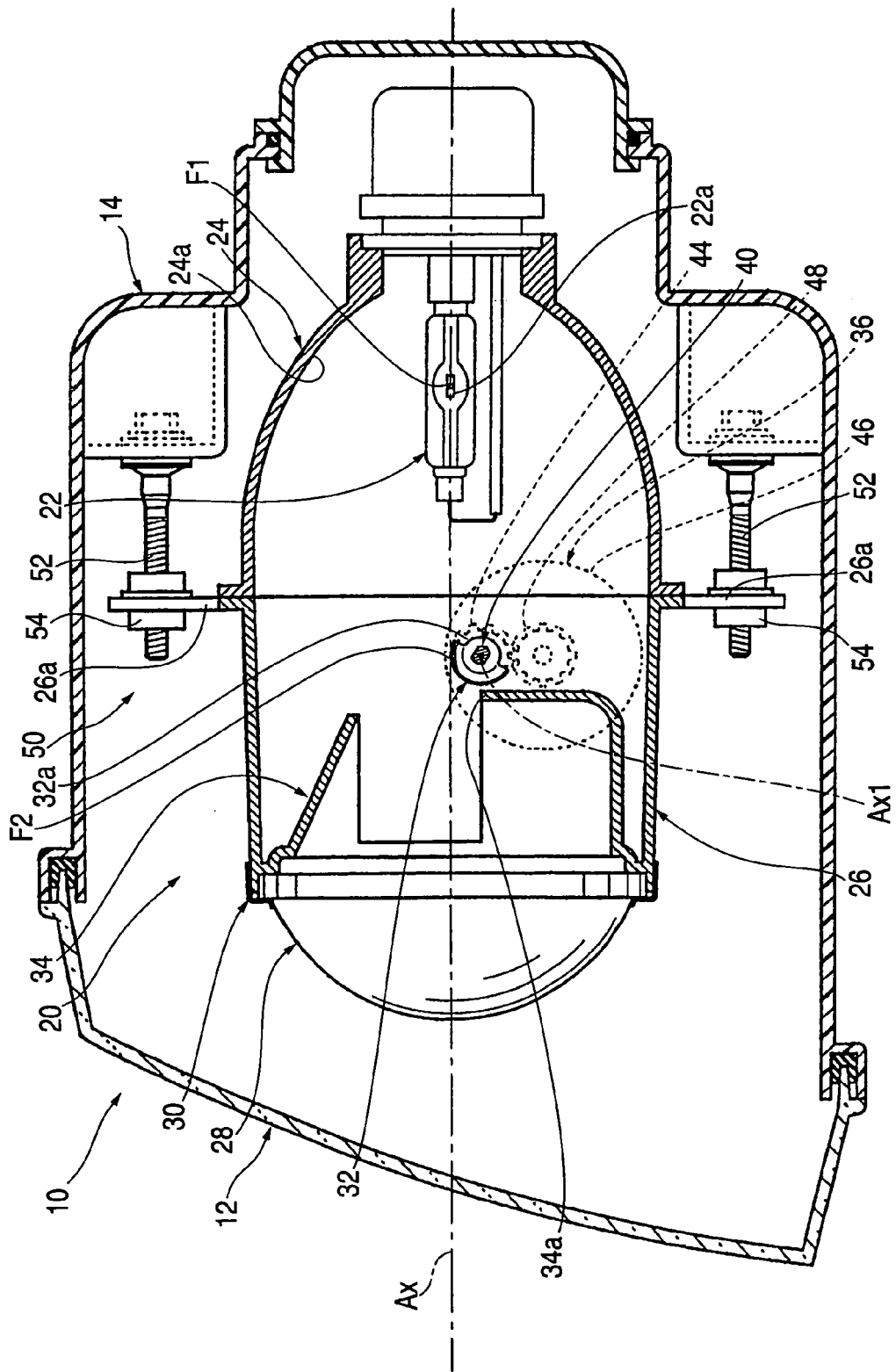
FIG. 1 is a side cross-sectional view showing a vehicle headlamp according to an exemplary, non-limiting embodiment of the present invention.
Figure 2:
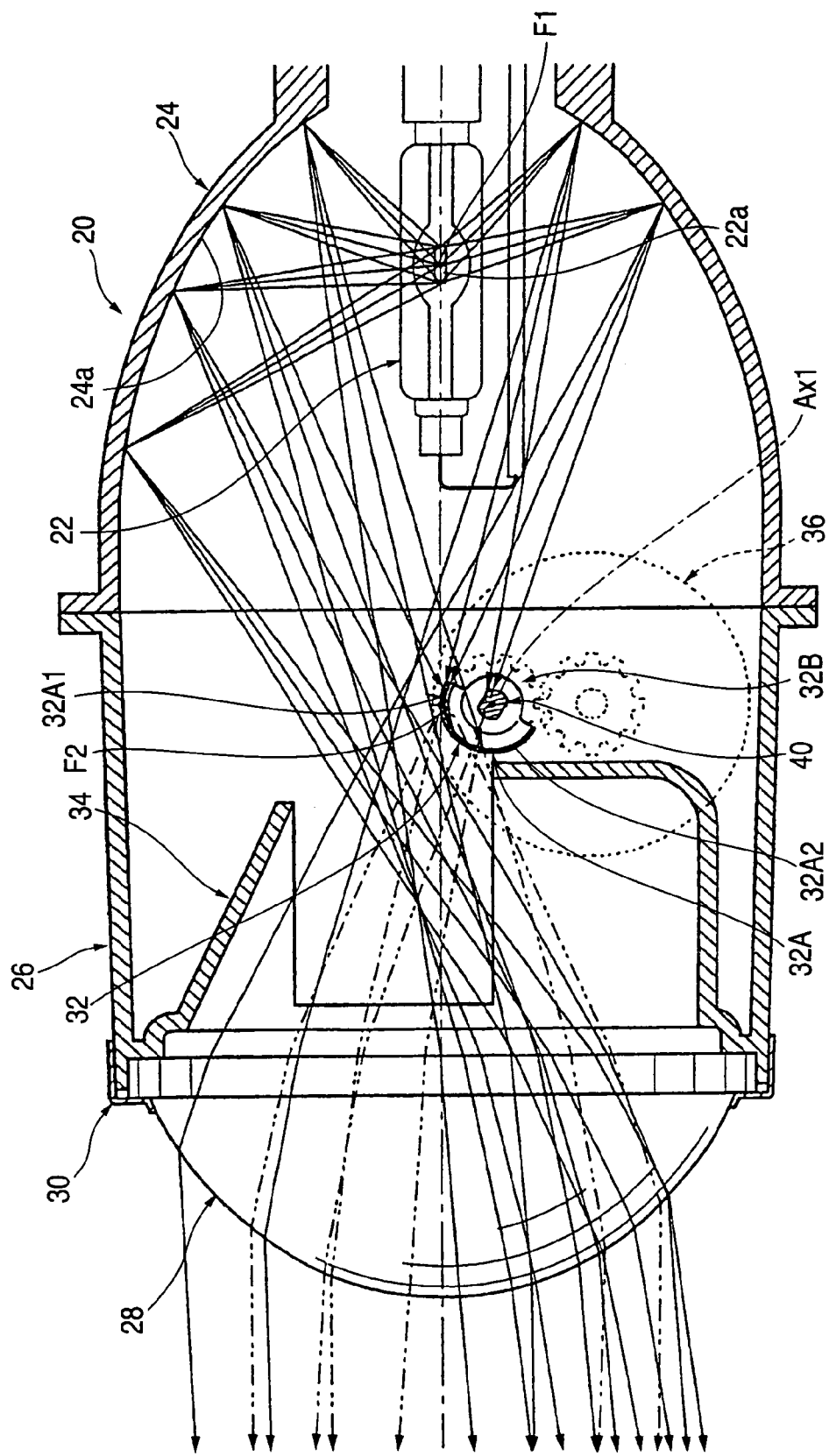
FIG. 2 is a side cross sectional view showing a lamp unit of the vehicle head lamp according to the exemplary, non-limiting embodiment of the present invention in a detailed manner, in which there is shown a state in which a shade of the lamp unit is situated at a left light distribution generation angular position.
Figure 3:
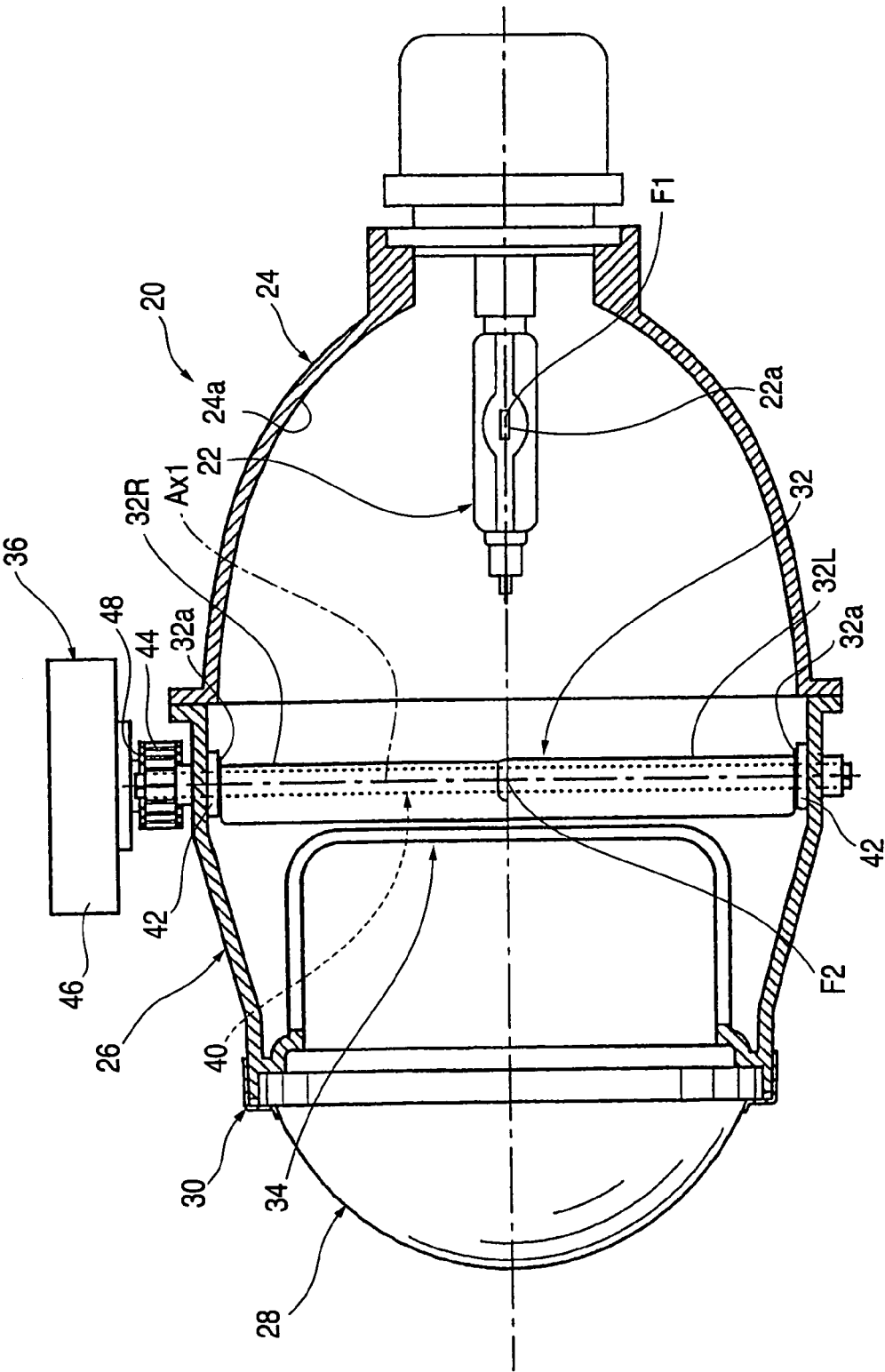
FIG. 3 is a plane cross-sectional view showing the lamp unit in detail according to the exemplary, non-limiting embodiment of the present invention.

FIG. 1 is a side cross-sectional view showing a vehicle headlamp according to an exemplary, non-limiting embodiment of the present invention. FIG. 2 is a side cross sectional view, and FIG. 3 is a plane cross-sectional view, both drawings showing a lamp unit of the headlamp in detail.

The vehicle headlamp 10 is constructed such that a lamp unit 20 having an optical axis Ax extending in the longitudinal direction of the vehicle is housed in a lamp chamber formed from a transparent cover 12 and a lamp body 14. Te vehicle headlamp 10 can tilt vertically and horizontally by an aiming mechanism 50.

The aiming mechanism 50 includes a bracket 26a of the lamp unit 20 being attached, by way of aiming nuts 54, to aiming screws 52 rotatably attached to a plurality of locations on the lamp body 14, and aiming adjustment of the lamp unit 20 is performed by means of the aiming mechanism 50. When aiming adjustment has been completed, the optical axis Ax of the lamp body 14 extends in a downward direction at an angle of 0.5° to 0.6° with respect to the longitudinal direction of the vehicle.

The lamp unit 20 is of a projector type and comprises a discharge valve 22, a reflector 24, a holder 26, a projection lens 28, a retaining ring 30, a shade 32, an auxiliary shade 34, and a shade drive mechanism 36.

The discharge valve 22 is a metal halide valve. A light source 22a constituted of a discharge illumination section of the valve is arranged coaxially with the optical axis Ax and attached to the reflector 24.

The reflector 24 has a substantially oval spherical reflection surface 24a with a center axis aligned with the optical axis Ax. A cross-sectional profile of the reflection surface 24a including the optical axis Ax is set to an essentially oval shape whose first focal point F1 is aligned to the center of the light source 22a. The reflection surface 24a gathers and reflects the light originating from the light source 22a toward the front and around the optical axis Ax. The eccentricity of the reflection surface 24a is set so that the reflection surface 24a gradually becomes larger from a vertical cross section to a horizontal cross section.

The holder 26 extends substantially cylindrically from a front-end opening section of the reflector 24 toward the front, and the reflector 24 is fixedly supported on the rear end of the holder 26. At a front end thereof, the holder 26 fixedly supports the projection lens 28 by way of the retaining ring 30, to thus arrange the projection lens 28 on the optical axis Ax.

The projection lens 28 is formed from a plano-convex lens having a convex front surface and a plane rear surface and projects forward, as a reverted image, an image of the light source 22a formed on a rear focal plane including a rear focal point F2 of the projection lens 28.

The shade 32 and the auxiliary shade 34 are disposed within an internal space of the holder 26, thereby shielding a portion of the light reflected from the reflector 24.

The shade 32 is rotatably supported by the holder 26, and the auxiliary shade 34 is integrally formed on the holder 26.

The shade 32 includes a pivot member which is disposed in the vicinity of an area located below the rear focal point F2 of the projection lens 28 and along a horizontal axis Ax1 extending in the transverse direction of the vehicle. Further, the shade 32 is configured to pivot about the horizontal axis Ax1.

Specifically, the shade 32 is formed from a plate-like metal member for surrounding, in a substantially semicylindrical manner, a metal core material 40—which is disposed on the horizontal axis Ax1 and has an oval cross-sectional profile—and fixed to the core material 40 by means of wall surface sections 32a formed on the respective ends of the shade 32. An outer peripheral surface 32A of the shade 32 is formed over a range of a center angle of about 180° with respect to the horizontal axis Ax1. A portion of the shade 32 corresponding to a range of a remaining center angle of about 180° is formed into an indentation section 32B.

The vicinities of the respective ends of the core material 40 are rotationally supported by the holder 26 by a pair of collars 42, and a gear 44 is fixed to one end of the core material 40.

The auxiliary shade 34 blocks the light reflected from the reflector that attempt to pass through a location below the shade 32, regardless of the rotational position of the shade 32, and also blocks stray light attempting to enter the projection lens 28.

The shade drive mechanism 36 comprises a stepping motor 46; a gear 48 fastened to an output shaft of the stepping motor 46; and the gear 44, which meshes with the gear 48. This shade drive mechanism 36 is driven and controlled by an unillustrated control unit in accordance with a driving condition of a vehicle or a beam changeover switching operation.

Figure 5A:
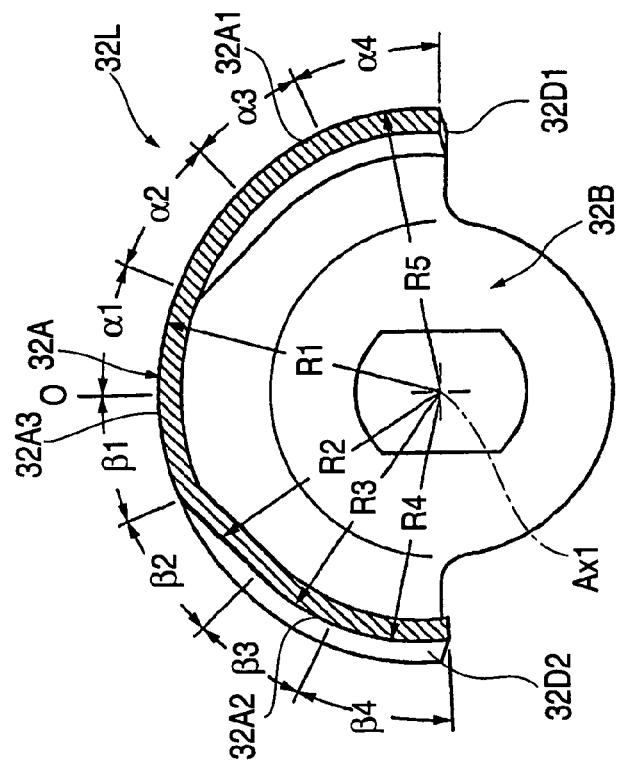
Figure 5B:
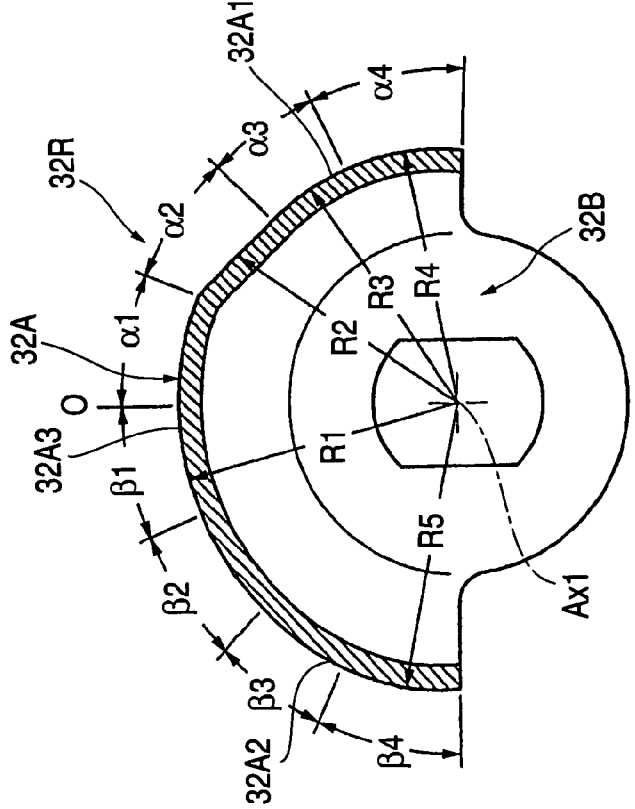

FIGS. 4A–B show the shade 32 as a single piece. FIG. 4A is a plan view of the shade 32, and FIG. 4B is a cross-sectional view taken along the horizontal axis Ax1. FIGS. 5A–B show the shade 32 in greater detail. FIG. 5A is a cross-sectional view of the shade 32 taken along line Va—Va shown in FIG. 4B, and FIG. 5B is a cross-sectional view of the same taken along line Vb—Vb shown in FIG. 4B.

As shown in FIGS. 5A and 5B, the outer peripheral surface 32A of the shade 32 is constituted of eight regions; that is, $\alpha 1$ through $\alpha 4$ and $\beta 1$ through $\beta 4$. Details of these regions are as follows. Specifically, $\alpha 1$, $\beta 1$ denote regions corresponding to angle ranges of 22.5° on respective sides of a circumferential reference position O on the outer peripheral surface 32A of the shade 32. Reference symbols $\alpha 2$, $\beta 2$ denote regions corresponding to angle ranges of 22.5° on respective sides of the $\alpha 1$, $\beta 1$ regions; $\alpha 3$, $\beta 3$ denote regions corresponding to angle ranges of 22.5° on respective sides of the $\alpha 2$, $\beta 2$ regions; and $\alpha 4$, $\beta 4$ denote regions corresponding to angle ranges of 22.50 on respective sides of the $\alpha 3$, $\beta 3$ regions.

The radial distance from the horizontal axis Ax1 to the outer peripheral surface 32A of the shade 32 is set to one value in a right half section 32R of the shade 32 but to another value in a left half section 32L of the same. In the present embodiment, the directions "Right" and "Left" denote directions when the reader faces forward of the vehicle.

First, the radial distance is set as follows in the right half section 32R of the shade 32. As shown in FIG. 5A, a radial direction R1 in the regions $\alpha 1$ and the regions $\beta 1$ to $\beta 3$ is set to the largest, constant value. The radial distance R1 is set to a value equal to a vertical distance between the rear focal point F2 of the projection lens 28 and the horizontal axis Ax1. A radial distance R3 in the region $\alpha 3$ is set to a predetermined value within a range of R3<R1. A radial distance R2 in the region $\alpha 2$ gradually changes from R1 to R3 as a distance from a circumferential reference position 0 becomes greater. Moreover, a radial distance R4 in the region $\alpha 4$ gradually changes from R3 so as to become a value smaller than R3 as a distance from the circumferential reference position O becomes greater, and a radial distance R5 in the region 14 gradually changes from R1 so as to become a value smaller than R1 as the distance from the circumferential reference position O becomes greater.

The left half section 32L of the shade 32 is set so as to become longitudinally symmetrical with the profile of the right half section 32R with respect to the circumferential reference position O.

As shown in FIG. 5B, the radial distance in the region $\beta 1$ and the regions $\alpha 1$ to $\alpha 3$ is set to R1; a radial distance in the region $\beta 3$ is set to R3; a radial distance in the region $\beta 2$ is set to R2; a radial distance in the region $\beta 4$ is set to R4; and a radial distance in the region $\alpha 4$ is set to R5.

The regions $\alpha 3$, $\alpha 4$ in the outer peripheral surface 32A of the shade 32 are formed as a first distributed light generation section 32A1 to be used for generating a left low beam light distribution pattern. Further, the regions $\beta 3$, $\beta 4$ in the outer peripheral surface 32A of the shade 32 are formed as a second distributed light generation section 32A2 to be used for generating a right low beam light distribution pattern. The regions $\alpha 1$, $\beta 1$ in the outer peripheral surface 32A of the shade 32 are formed as a light distribution switching section 32A3 to be used for generating a transient light distribution pattern required when switching is effected between the left low beam light distribution pattern and the right low beam light distribution pattern.

An indentation section 32B in the shade 32, where the outer peripheral surface 32A is not formed, acts as a third distributed light generation section for generating a high beam light distribution pattern.

As shown in FIGS. 4A–B, a slope section 32D1 is formed in a rear-side portion of a boundary between the left half section 32L and the right half section 32R of the shade 32 to extend in a circumferential direction. Another slope section 32D2 is formed in a forward-side portion of the boundary so as to extend in the circumferential direction. By the slope sections 32D1, 32D2, a difference in radial distance between the left half section 32L and the right half section 32R is interpolated. At this time, these slope sections 32D1, 32D2 are formed at a tilt angle of about 30° with respect to the horizontal axis Ax1.

In the vehicle headlamp 10 of the exemplary, non-limiting embodiment, the shade 32 is selectively pivoted to any of the three positions by means of drive control of the shade drive mechanism 36; that is, a left light distribution formation angular position, a right light distribution formation angular position, and a high beam formation angular position.

Figure 6:
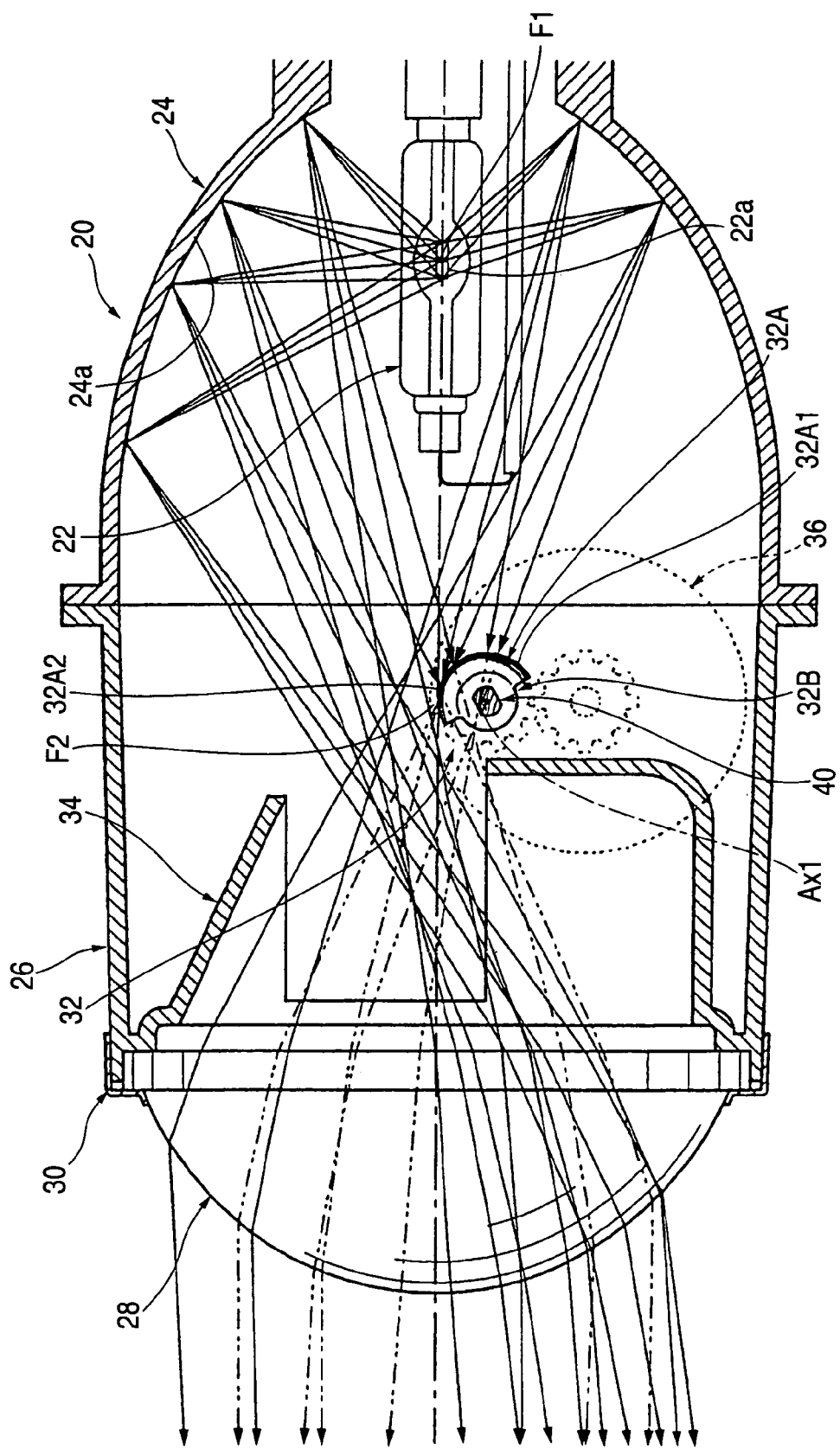
FIG. 6 is a view analogous to FIG. 2, showing the state of the shade when the shade is located at the right light distribution formation angular position, according to the exemplary, non-limiting embodiment of the present invention.
Figure 7:
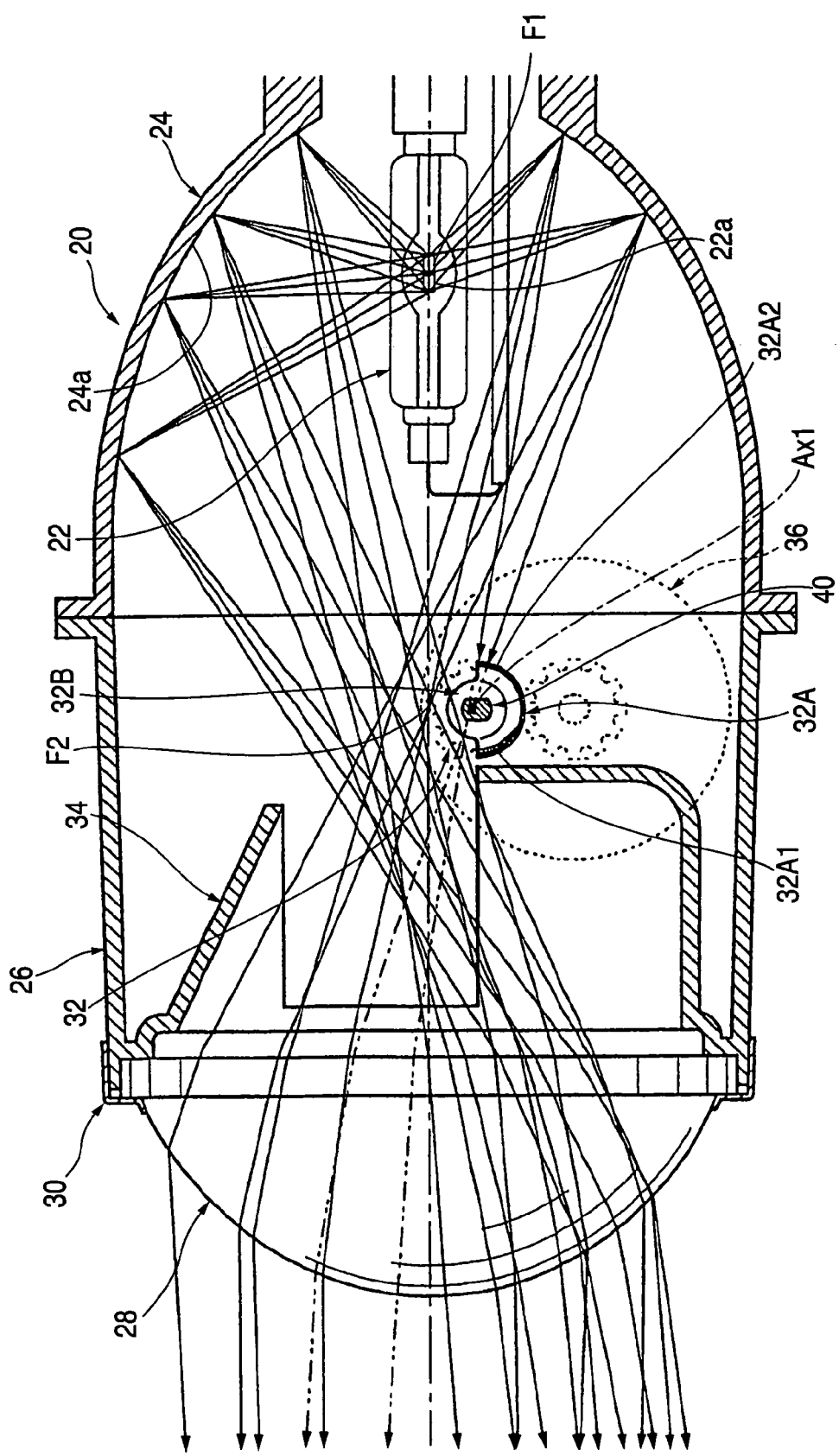
FIG. 7 is a view analogous to FIG. 2, showing the state of the shade when the shade is located at the high beam formation angular position, according to the exemplary, non-limiting embodiment of the present invention.

FIGS. 1 through 3 show the state of the shade 32 when the shade 32 is located at the left light distribution formation angular position. FIGS. 6 and 7 are views analogous to FIG. 2, wherein FIG. 6 shows the state of the shade 32 when the shade 32 is located at the right light distribution formation angular position, and FIG. 7 shows the state of the shade 32 when the shade 32 is located at the high beam formation angular position.

FIGS. 8A–B and 9A–B are front views showing the principal sections of the lamp unit 20. Namely, FIG. 8A is a view showing the state of the shade 32 when the shade 32 is situated at the left light distribution formation angular position; and FIG. 8B is a view showing the state of the shade 32 when the shade 32 is situated at the right light distribution formation angular position. FIG. 9A is a view showing the state of the shade 32 when the shade 32 is situated at the high beam formation angular position; and FIG. 9B is a view showing the state of the shade 32 when the shade 32 is situated at the left/right light distribution switching position.

As shown in FIGS. 2 and 8A, when the shade 32 is situated at the left light distribution formation angular position, rotational movement control is performed such that the first distributed light generation section 32A1 comes to the position directly above the horizontal axis Ax1. At this time, the left half section 32L of the shade 32 extends horizontally at the same level as that of the optical axis Ax within the focal plane of the rear focal point F2 of the projection lens 28, and the right half section 32R extends horizontally from a position slightly lower than the optical axis Ax. At that time, a right edge of the left half section 32L is situated at a position above the rear focal point F2, and the slope section 32D1 extends from the rear focal point F2 to the right half section 32R in a right downward direction. As a result of the shade 32 being disposed in this manner, a portion of the light reflected from the reflection surface 24a of the reflector 24 is blocked, thereby eliminating the majority of the upward light exiting from the projection lens 28 to the front.

FIG. 10A shows a perspective view of a light distribution pattern formed, by the light forwardly radiating from the lamp unit 20, on a virtual vertical screen disposed at a position spaced about 25 m ahead of the lamp unit.

As illustrated, a light distribution pattern PLL is the left low beam light distribution pattern having a cut-off line CLL formed at an upper end thereof, and a hot zone HZL is formed as a high-intensity region at an upper center of the pattern. The cut-off line CLL of this left low beam light distribution pattern PLL is formed as a double-level horizontal cut-off line; that is, a portion of the cut-off line located in a lane of a driver's vehicle being higher than a remaining portion of the same located in a lane for oncoming vehicles. Moreover, an elbow point EL, which is a point of intersection between the horizontal cut-off line on the lane for oncoming vehicles and the line V—V (i.e., a vertical line passing through a vanishing point H–V located in the front direction of the lamp), is set to a position slightly lower than the vanishing point H–V (more specifically, a position located lower than H–V by about 0.5° to 0.60). A short oblique cut-off line is formed at a tilt angle of about 30° from the position of the elbow point EL toward the horizontal cut-off line located in the lane of the driver's vehicle.

As shown in FIGS. 6 and 8B, when the shade 32 is situated at the right light formation angular position, rotational movement control is performed such that the second distributed light generation section 32A2 comes to the position directly above the horizontal axis Ax1. At this time, the right half section 32R of the shade 32 extends horizontally at the same level as that of the optical axis Ax within the focal plane of the rear focal point F2 of the projection lens 28, and the left half section 32L extends horizontally from a position slightly lower than the optical axis Ax. At that time, a left edge of the right half section 32R is situated at a position above the rear focal point F2, and the slope section 32D2 extends from the rear focal point F2 to the left half section 32L in a left downward direction. As a result of the shade 32 being disposed in this manner, a portion of the light reflected from the reflection surface 24a of the reflector 24 is blocked, thereby eliminating the majority of the upward light exiting from the projection lens 28 to the front.

FIG. 10B is a view perspectively showing a light distribution pattern formed, by the light forwardly radiating from the lamp unit 20, on the previously-described virtual vertical screen at this time.

As illustrated, a light distribution pattern PLR is the right low beam light distribution pattern having a cut-off line CLR formed at an upper end thereof, and a hot zone HZR is formed at an upper center of the pattern. The cut-off line CLR of this right low beam light distribution pattern PLR is formed as a double-level horizontal cut-off line; that is, a portion of the cut-off line located in the lane of a driver's vehicle higher than a remaining portion of the same located in the lane for oncoming vehicles. Moreover, an elbow point ER is set to the same position as that of the elbow point EL of the left low beam light distribution pattern PLL. An oblique cut-off line is formed at a tilt angle of about 30° from the position of the elbow point ER toward the horizontal cut-off line located in the lane of the driver's vehicle.

As shown in FIGS. 7 and 9A, when the shade 32 is situated at the high beam formation angular position, rotational movement control is performed such that the circumferential center of an indentation section 32B comes to the position right above the horizontal axis Ax1. At this time, the shade 32 is situated at a position lower than an upper edge 34a in a lower portion of the auxiliary shade 34 within the focal plane of the rear focal point F2 of the projection lens 28, and a substantially upper half of the core material 40 supporting the shade 32 becomes exposed from the upper edge 34a of the lower portion of the auxiliary shade 34 and extends in a horizontal direction. As a result of the shade 32 being arranged in this manner, the light reflected from the reflection surface 24a of the reflector 24 enters the projection lens 28 essentially without being blocked by the shade 32 and the core material 40.

FIG. 11A shows a light distribution pattern formed, by the light forwardly radiating from the lamp unit 20, on the previously-described virtual vertical screen.

As illustrated, the light distribution pattern PH is a high beam light distribution pattern which spreads widely above the line H—H (i.e., the horizontal line passing through the vanishing point H–V located in the forward direction of the lamp), and a hot zone HZH serving as a high intensity region is formed in the center of the pattern.

In the present embodiment, when the shade 32 is pivoted between the left light distribution formation angular position and the right light distribution formation angular position, rotational movement is controlled by way of the light distribution switching section 32A3. Specifically, as shown in FIG. 9B, when positioned between the left and right distribution switching positions, the shade 32 is situated at a position directly above the horizontal axis Ax1. At this time, the right half section 32R and the left half section 32L of the shade 32 extend horizontally at the same level as the optical axis Ax within the focal plane of the rear focal point F2 of the projection lens 28. As a result of the shade 32 being arranged in this manner, a portion of the light reflected from the reflection surface 24a of the reflector 24 is blocked, thereby completely removing the upward light forwardly radiating from the projection lens 28.

FIG. 11B is a view perspectively showing a light distribution pattern transiently formed, by the light forwardly radiating from the lamp unit 20, on the previously-described virtual vertical screen. A transient light distribution pattern PLo becomes a light distribution pattern having a cut-off line formed at an upper end thereof. At this time, the cut-off line CLo of the transient light distribution pattern PLo is formed as a horizontal cut-off line which is located below a cut-off line CLL of the left low beam light distribution pattern PLL and the cut-off line CLR of the right low beam light distribution pattern PLR and which extends horizontally at the same level as that of the horizontal cut-off line.

In the present embodiment, rotational movement of the shade 32 between the left light distribution formation angular position and the right light distribution formation angular position is performed in accordance with information about the position of a vehicle (e.g., navigational information obtained through use of a GPS or like information). Rotational movement of the shade 32 between the left light distribution formation angular position or the right light distribution formation angular position and the high beam formation angular position is performed in accordance with a beam changeover switching action.

In the present embodiment, drive control of the shade drive mechanism 36 is performed in accordance with vehicle speed, whereby the positions of the cut-off lines CLL, CLR are moved vertically.

Figure 12A:
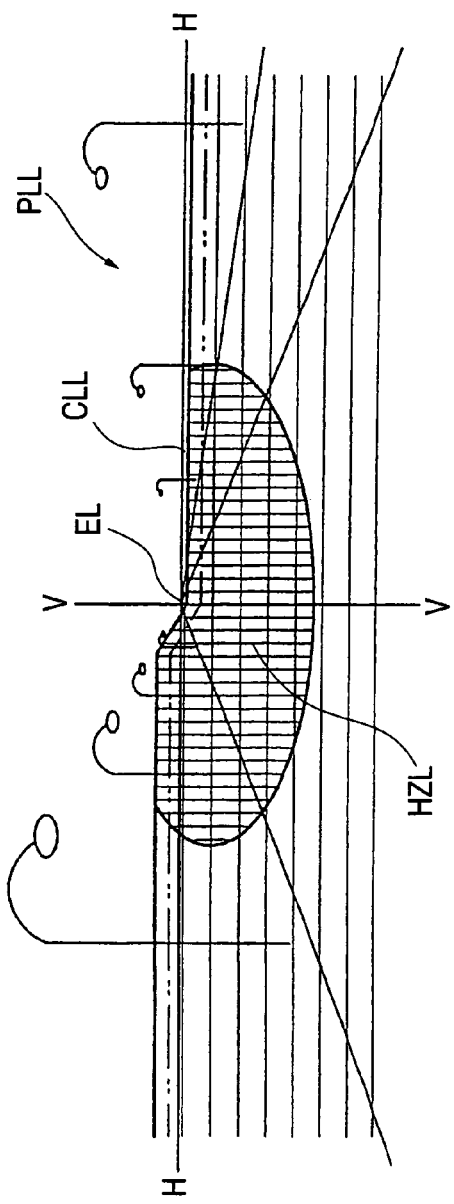

When the shade 32 is situated at the left light distribution formation angular position, when the vehicle is in the course of normal driving (e.g., when the vehicle is running at a vehicle speed of 60 km/h or less), rotational control is performed such that the region $\alpha 3$ of the first distribution light generation section 32A1 (see FIGS. 5A–B) is situated directly above the horizontal axis Ax1. However, during the course of high-speed driving (e.g., when the vehicle is running at a speed in excess of 60 km/h), rotational control is performed such that the region $\alpha 4$ of the first distribution light generation section 32A1 is situated directly above the horizontal axis Ax1. As a result, during the course of high-speed driving, the position of the cut-off line CLL is displaced upward with respect to the position of the cut-off line CLL—which is achieved during normal driving and indicated in FIG. 12A by a two-dot chain line—as indicated by solid lines, thereby enhancing visibility of a distant region on the road surface ahead of the vehicle.

At that time, the radial distances R4 and R5 in the region $\alpha 4$ of the first distributed light generation section 32A1 have already gradually changed so as to become slightly smaller than the radial distances R3 and R1 in the region $\alpha 3$ toward the edge of the outer peripheral surface 32A. Hence, if the rotational position of the shade 32 approaches the edge of the outer peripheral surface 32A, the position of the cut-off line CLL gradually moves upward. In the present embodiment, as a result of rotational control having been performed for causing the rotational position of the shade 32 to approach the edge of the outer peripheral surface 32A in association with an increase in vehicle speed, the position of the cut-off line CLL is gradually moved upward, thereby enhancing, to a much greater extent, the visibility of the distant region in the road surface ahead of the vehicle in accordance with an increase in vehicle speed.

Figure 12B:
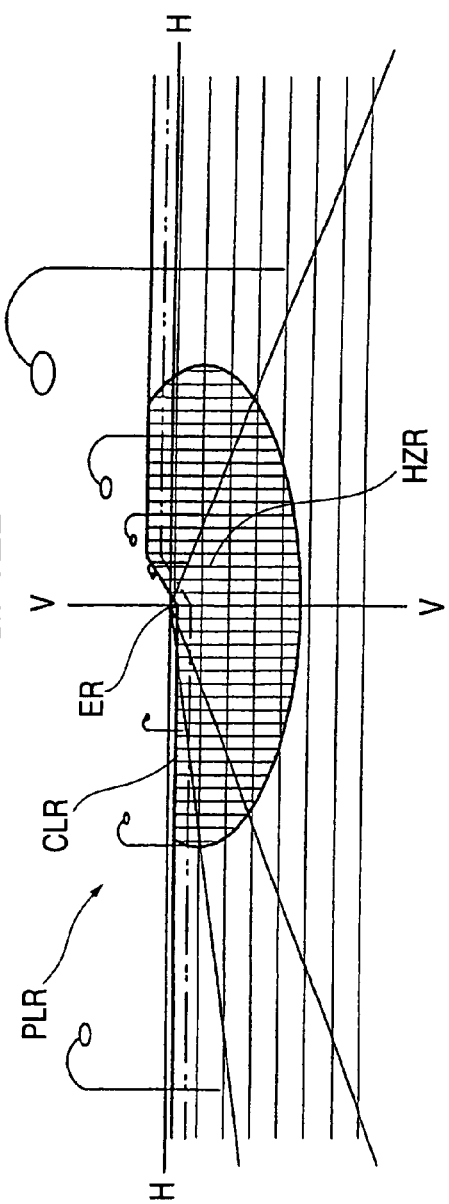

When the shade 32 is situated at the right light distribution formation angular position, when the vehicle is in the course of normal driving, rotational control is performed such that the region $\alpha 3$ of the first distribution light generation section 32A1 is situated directly above the horizontal axis Ax1. However, during the course of high-speed driving, rotational control is performed such that the region $\alpha 4$ of the first distribution light generation section 32A1 is situated directly above the horizontal axis Ax1. As a result, during the course of high-speed driving, the position of the cut-off line CLL is displaced upward with respect to the position of the cut-off line CLR—which is achieved during normal driving and indicated in FIG. 12B by a two-dot chain line—as indicated by solid lines, thereby enhancing visibility of a distant region on the road surface ahead of the vehicle.

At that time, the radial distances R4 and R5 in the region $\beta 4$ of the first distributed light generation section 32A1 also have already gradually changed so as to become slightly smaller than the radial distances R3 and R1 in the region $\beta 3$ toward the edge of the outer peripheral surface 32A. Hence, as a result of rotational control having been performed for causing the rotational position of the shade 32 to approach the edge of the outer peripheral surface 32A in association with an increase in vehicle speed, the position of the cut-off line CLR is gradually moved upward, thereby enhancing, to a much greater extent, the visibility of the distant region in the road surface ahead of the vehicle in accordance with an increase in vehicle speed.

Since the distance between a vehicle ahead and the driver's vehicle is sufficiently long during high-speed driving, even when the cut-off lines CLL, CLR have deviated somewhat upward, casting of great glare onto the driver of the vehicle ahead or the like can be avoided.

As has been described in detail, the vehicle headlamp 10 of the embodiment is constituted of the lamp unit 20 of projector type provided with the pivotable shade 32 that forms a light distribution pattern having a cut-off line at an upper end thereof. The shade 32 is constituted of the pivot member, wherein the pivot member is arranged in the vicinity of an area below the optical axis Ax of the lamp unit 20 and along the horizontal axis Ax1 extending in the transverse direction of the vehicle and is constituted to pivot about the horizontal axis Ax1. The indentation section 32B extending in the transverse direction of the vehicle is formed in a circumferential portion of the outer peripheral surface 32A. The two areas in the outer peripheral surface 32A in the circumferential direction thereof are formed as the first distributed light generation section 32A1 to be used for generating the left low beam light distribution pattern PLL and the second distributed light generation section 32A2 to be used for generating the right low beam light distribution pattern PLR. Further, the indentation section 32B is formed as the third distributed light generation section for generating a high beam light distribution pattern PH. Hence, the following working-effects can be obtained.

More specifically, if the first distributed light generation section 32A1 is moved to the upper section by means of pivoting the shade 32, the left low beam light distribution pattern PLL can be generated by means of the shade's action of blocking the light reflected from the reflector. If the second distributed light generation section 32A2 is moved to the upper section by means of pivoting the shade 32, the right low beam light distribution pattern PLR can be generated by means of the shade's action of blocking the light reflected from the reflector. Moreover, if the indentation section 32B is arranged to the upper section, the shade's 32 action of blocking the light reflected from the reflector is canceled or significantly alleviated, thereby enabling generation of the high beam light distribution pattern PH.

The shade 32 is arranged to generate the left low beam light distribution pattern PLL and the right low beam light distribution pattern PLR on the outer peripheral surface 32A. The first and second distributed light generation sections 32A1, 32A2 are formed over a predetermined angle range in the circumferential direction. Hence, when some displacement has occurred in the rotational angular position of the shade 32, occurrence of a substantial change in the shape of the cut-off line CLL of the left low beam light distribution pattern PLL and the shape of the cut-off line CLR of the right low beam light distribution pattern PLR can be substantially prevented. As a result, there can be obviated a necessity for strictly controlling rotational movement of the shade 32.

As mentioned above, the present embodiment enables switching between a left light distribution of low beam and a right light distribution of low beam and switching between the low beam and the high beam, as well as simplification of rotational control of the shade 32.

In the present embodiment, the outer peripheral surface 32A of the shade 32 is formed over the range of central angle of about 180° with respect to the horizontal axis Ax1. Hence, the circumferential range in which the first and second distributed light generation sections 32A1, 32A2 are to be formed is ensured sufficiently. Further, the indentation section 32B constituting the third distributed light generation section is given a shape sufficiently receded from the outer peripheral surface 32A of the shade 32, thereby enabling an attempt to cancel or significantly alleviate the shade's 32 action for blocking the light reflected from the reflector.

Further, in the present embodiment, the shade 32 is formed from a plate-like member. Accordingly, as compared with a case where the shade is formed from a block-shaped member or the like, the shade 32 can be made lightweight, and the shade 32 can also be manufactured at low cost by means of press-molding or the like.

Further, in the present embodiment, the region α4 of the first distributed light generation section 32A1 and the region β4 of the second distributed light generation section 32A2 are formed such that the radial distances R4, R5 from the horizontal axis Ax1 to the outer peripheral surface 32A of the shade 32 gradually change in accordance with a change in the circumferential angular position. Hence, the positions of the cut-off lines CLL, CLR can be vertically changed in a stepless manner in accordance with the driving conditions or the like. As result, the forward visibility of the driver can be enhanced to a great extent while suppressing casting of glare onto drivers of oncoming vehicles or the like.

Particularly, in the present embodiment, the radial distance R3 of the region α3 of the first distributed light generation section 32A1 and the radial distance R5 of the region β3 of the second distributed light generation section 32A2 are set to given values. Therefore, within the angle ranges of these regions α3, β3, the cut-off line CLL of the left low beam light distribution pattern PLL and the cut-off line CLR of the right low beam light distribution pattern PLR can be held at a height.

In relation to the region α4 of the first distributed light generation section 32A1 and the region β4 of the second distributed light generation section 32A2, the radial distances R4, R5 vary according to the angular positions within the regions α4, β4. However, the radial distances change gradually. Even when some displacement has occurred in the rotational angular position of the shade 32, the cut-off line CLL of the left low beam light distribution pattern PLL and the cut-off line CLR of the right low beam light distribution pattern PLR can be set to essentially-intended heights.

At that time, the present embodiment has described that the angle ranges of the regions α3, β3 are set to about 20° and that the angle ranges of the regions α4, β4 are set to about 25°. However, as a matter of course, the angle ranges can also be set to values other than those angles. Moreover, the first distributed light generation section 32A1 and the second distributed light generation section 32A2 are formed such that the radial distance assumes a given value over the entire angle ranges of the distributed light generation sections or such that the radial distance gradually changes over the entire angle ranges of the distributed light generation sections.

In the embodiment, the light distribution switching section 32A3 is formed between the first distributed light generation section 32A1 and the second distributed light generation section 32A2 in the outer peripheral surface 32A of the shade 32, wherein the radial distance of the light distribution switching section 32A3 is equal to the radial distance R1 of the region α3 of the first distributed light generation section 32A1, where the distance from the horizontal axis Ax1 to the outer peripheral surface 32A of the shade 32 becomes maximum, and to the radial distance R1 of the region β3 of the second distributed light generation section 32A2, where the distance from the horizontal axis Ax1 to the outer peripheral surface 32A of the shade 32 becomes maximum. Hence, switching between the left-distributed light of low beam and the right-distributed light of low beam can be performed without occurrence of glaring light.

In the present embodiment, rotational switching between the first distributed light generation section 32A1 and the second distributed light generation section 32A2 is performed on the basis of the positional information about the vehicle. Therefore, switching between the left low beam distribution and the right low beam distribution is adequately performed according to geographical conditions. As a result, there can be prevented inadvertent casting of glare onto, e.g., drivers of oncoming vehicles, which would otherwise be caused as a result of having forgotten to perform manual switching.

Next, a modification of the shade 32 of the embodiment will be described.

Figure 13B:
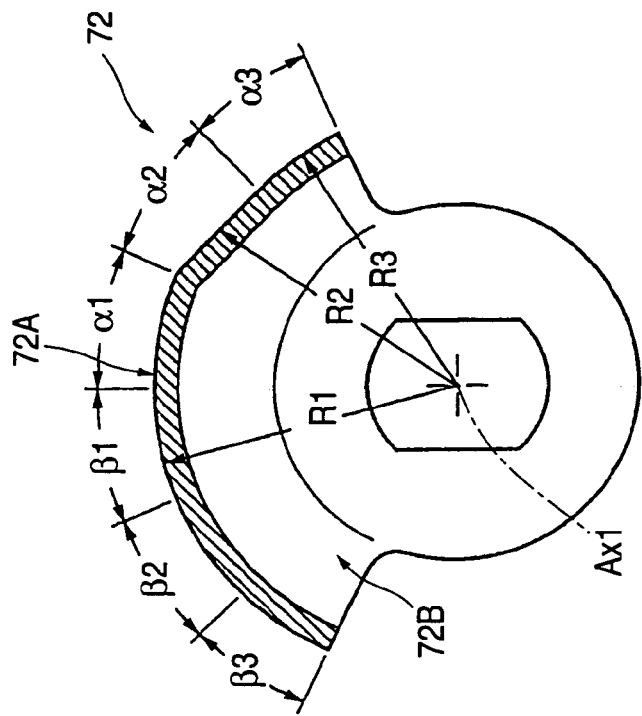
Figure 13A:
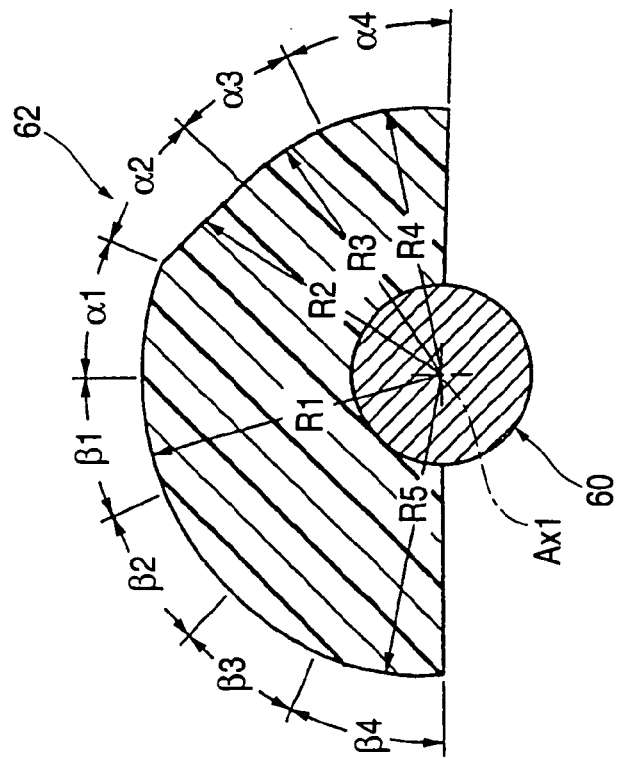

FIG. 13A is a view analogous to FIG. 5A, showing a shade 62 according to a first exemplary, non-limiting modification of the present invention.

The shade 32 of the above-disclosed embodiment is formed from a plate-like metal member, but the shade 62 of the present modification is formed from a block-shaped member of synthetic resin formed into a substantially-semi-columnar shape so as to cover a metal core material 60. As in the case of the core material 40 of the foregoing disclosed embodiment, the core material 60 is supported by the holder 26 in the vicinity of both ends of the core material, to be rotatable. The entirety of the core material 60 or both ends of the core material 60 can also be formed integrally from synthetic resin as a part of the shade 62.

FIG. 13B is a view analogous to FIG. 5A, showing a shade 72 of a second exemplary, non-limiting modification of the above-disclosed embodiment of the present invention.

The foregoing embodiment discloses that the outer peripheral surface 32A of the shade 32 is formed over a range of center angle of about 180° with respect to the horizontal axis Ax1. However, the shade 72 of the embodiment is set to a center angle substantially smaller than 180°. In the shade 72 of this modification, an angle range of an outer peripheral surface 72A of the shade 72 is set to a center angle substantially smaller than an angle of 180°. Specifically, the shade 72 is configured such that an area corresponding to an angle range of about 130°, which is a sum of the angle range of the region α4 of the first distributed light generation section 32A1 and the angle range of the region β4 of the second distributed light generation section 32A2, subtracted from the shade 32 of the embodiment.

As mentioned above, as a result of the angle range of the outer peripheral surface 72A of the shade 72 being set to a center angle substantially smaller than about 180°, the center angle of an area which is to be an indentation section 72B can be ensured sufficiently. Accordingly, the quantity of light reflected from the reflector, which would be blocked by the shade 72 when the shade 72 is rotated to a high-beam formation angular position, can be curbed to a small quantity. As a result, a larger quantity of luminous flux utilized at the time of generation of a high-beam light distribution pattern can be ensured.

The invention claimed is:

1. A vehicle headlamp configured to form a light distribution pattern having a cut-off line formed at an upper end portion thereof by a lamp unit comprising:
   a light source disposed substantially in an optical axis extending in a longitudinal direction of a vehicle;
   a reflector for gathering and reflecting light originating from said light source toward a front of said vehicle headlamp and around said optical axis;
   a projection lens disposed ahead of said reflector; and
   a shade disposed at a rear focal point of said projection lens, said shade interrupting a portion of said light reflected from said reflector, said shade formed of a plate-like member wherein;
      a pivot member is disposed along a horizontal axis extending in a transverse direction of said vehicle substantially below said optical axis and configured to pivot about said horizontal axis;
      an indented section extends in a transverse direction of said vehicle formed in a portion of an outer peripheral surface of said shade in a circumferential direction; and
      two areas in said outer peripheral surface of said shade in said circumferential direction are formed as a first distributed light generation section for generating a light distribution pattern for a left-distributed low beam and a second distributed light generation section for generating a light distribution pattern for a right-distributed low beam, wherein said indented section of said shade is formed as a third distributed light generation section for generating a light distribution pattern for a high beam.

2. The vehicle headlamp according to claim 1, wherein said outer peripheral surface of said shade is formed over a range of central angle of about 180° with respect to said horizontal axis.

3. The vehicle headlamp according to claim 1, wherein at least respective portions of said first and second distributed light generation sections in a circumferential direction are formed such that a radial distance from said horizontal axis to said outer peripheral surface of said shade gradually changes with angular positions of said portions in said circumferential direction.

4. The vehicle headlamp according to claim 1, wherein a light distribution switching section is formed between said first and second distributed light generation sections on an outer peripheral surface of said shade and is greater in radial distance than areas of said first and second light distribution sections, where a radial distance from said horizontal axis to said outer peripheral surface of said shade is greatest.

5. The vehicle headlamp according to claim 1, wherein switching of rotational movement between said first and second light distribution sections is effected in accordance with information about a position of said vehicle.

6. A headlamp for a vehicle, said headlamp generating a light distribution pattern having an upper cutoff, comprising:
   a lamp unit having an optical axis extending in a longitudinal direction of said vehicle, said lamp unit including a transparent cover and a lamp body, wherein said lamp unit can be movably aimed, said lamp body including,
      a discharge valve for generating and outputting said light,
      a reflector that reflects said generated light toward a focal point at a front of said headlamp along said optical axis,
      a projection lens that projects said reflected light as a reverted image, and
      a shade that shields a portion of said generated light from said projection lens,
      wherein said shade is formed of a metal plate member that surrounds a core in a substantially semi-cylindrical manner, and an outer peripheral surface formed over a prescribed range; and
         wherein when said shade is rotated to a first position with said right side having a substantially greater radial distance than said left side, said light distribution pattern is a right light distribution; when said shade is rotated to a second position with said left side having a substantially greater radial distance than said right side, said light distribution pattern is a left light distribution; and when said shade is rotated to a third position with said left side and said right side having substantially equal and minimal radial distances for blocking said generated light, a high beam distribution pattern is formed.

7. The headlamp of claim 6, wherein said prescribed range is one of: (a) about 180 degrees and (b) about 50 degrees.

8. The headlamp of claim 6, wherein said shade is pivoted via a motor in response to a signal from a control unit.

9. The headlamp of claim 6, wherein said shade comprises a left half and a right half, each having a plurality of symmetrically opposed regions and corresponding portions with a substantially different radial distance.

10. The headlamp of claim 6, wherein said shade is rotated based on information about at least one of a position, a driving condition of said vehicle or a control signal.

11. The headlamp of claim 6, wherein said shade is controlled in accordance with a velocity of said vehicle, so as to enhance visibility in response to an increase in said velocity.

12. The headlamp of claim 6, wherein said rotation of said shade results in a gradual change in said light distribution pattern.

13. A headlamp for a vehicle, said headlamp generating a light distribution pattern having an upper cutoff, comprising:
   a lamp unit having an optical axis extending in a longitudinal direction of said vehicle, said lamp unit including a transparent cover and a lamp body, wherein said lamp unit can be movably aimed, said lamp body including,
      a discharge valve for generating and outputting said light,
      a reflector that reflects said generated light toward a focal point at a front of said headlamp along said optical axis,
      a projection lens that projects said reflected light as a reverted image, and
      a shade that shields a portion of said generated light from said projection lens,
      wherein said shade comprises a synthetic resin member that surrounds a core in a substantially semi-columnar manner; and wherein when said shade is rotated to a first position with said right side having a substantially greater radial distance than said left side, said light distribution pattern is a right light distribution; when said shade is rotated to a second position with said left side having a substantially greater radial distance than said right side, said light distribution pattern is a left light distribution; and when said shade is rotated to a third position with said left side and said right side having substantially equal and minimal radial distances for blocking said generated light, a high beam distribution pattern is formed.

* * * * *